US006891932B2

(12) United States Patent
Bhargava et al.

(10) Patent No.: US 6,891,932 B2
(45) Date of Patent: May 10, 2005

(54) SYSTEM AND METHODOLOGY FOR VOICE ACTIVATED ACCESS TO MULTIPLE DATA SOURCES AND VOICE REPOSITORIES IN A SINGLE SESSION

(75) Inventors: Gautam Bhargava, Cupertino, CA (US); Ramneek Bhasin, Cupertino, CA (US); Slva V. Kumar, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 93 days.

(21) Appl. No.: 10/015,026

(22) Filed: Dec. 11, 2001

(65) Prior Publication Data

US 2003/0123618 A1 Jul. 3, 2003

(51) Int. Cl.[7] ............................................. H04M 1/64
(52) U.S. Cl. ...................... 379/88.02; 704/9; 709/218
(58) Field of Search .......................... 379/88.01, 88.02, 379/88.03, 88.04, 88.17, 93.24; 455/563; 701/207; 704/1, 8, 9, 275, 257; 709/218

(56) References Cited

U.S. PATENT DOCUMENTS

| | | | | |
|---|---|---|---|---|
| 5,479,488 A | * | 12/1995 | Lennig et al. | ............ 379/88.04 |
| 5,748,974 A | * | 5/1998 | Johnson | ......................... 704/9 |
| 6,154,527 A | | 11/2000 | Porter et al. | |
| 6,163,596 A | | 12/2000 | Gelfer et al. | |
| 6,212,408 B1 | * | 4/2001 | Son et al. | .................... 455/563 |
| 6,370,506 B1 | * | 4/2002 | Ahluwalia | ............... 379/88.01 |
| 6,411,893 B2 | * | 6/2002 | Ruhl | ....................... 379/88.01 |
| 6,501,834 B1 | * | 12/2002 | Milewski et al. | ........ 379/93.24 |
| 6,504,914 B1 | * | 1/2003 | Brademann et al. | ..... 379/88.01 |

FOREIGN PATENT DOCUMENTS

WO      WO 01/76212      10/2001

* cited by examiner

*Primary Examiner*—Fan Tsang
*Assistant Examiner*—Gerald Gauthier
(74) *Attorney, Agent, or Firm*—Carpenter & Kulas, LLP

(57) ABSTRACT

A system and method and computer program for seamlessly accessing multiple data sources and voice repositories using voice commands in a single phone call session. The system comprises of voice grammars that span various contexts for all data sources and voice repositories, a telephony platform, an automatic speech recognition engine, extractors for extracting information from the data sources and voice repositories and an interpreter for controlling the extractors and telephony platform. It is the co-operation between the voice grammars and the telephony platform, controlled by a VoiceXML interpreter that enables this seamless access to information from the multiple data sources and voice repositories.

8 Claims, 4 Drawing Sheets

SYSTEM AND METHODOLOGY FOR VOICE ACTIVATED ACCESS TO MULTIPLE DATA SOURCES AND VOICE REPOSITORIES IN A SINGLE SESSION

BACKGROUND OF THE INVENTION

1. Field of the Invention

The present invention generally relates to voice activated access to information. More specifically, the invention relates to a system, method and computer program for providing voice activated seamless access to information from multiple data sources and/or voice repositories in a single phone call session.

2. Description of Related Art

An enterprise can leverage significant competitive advantage by ensuring quick and timely access to its business information that is stored as both structured and unstructured data. This information can be used to enable its employees, suppliers, customers, business partners and others to make informed decisions.

Traditionally computers, personal digital assistants (PDA's) and other types of visual interfaces have been used for accessing information from enterprise data sources. However, the use of visual interfaces may not always be practical and convenient for mobile professionals such as job inspectors, field technicians and others whose job requires them to be constantly in transit. These mobile professionals would always be required to carry a computer or other types of visual interfaces to enable them access to enterprise data sources.

Aural interfaces can be a viable alternative for such mobile professionals. The most elementary form of an aural interface is where the mobile professional obtains the relevant information by calling up a colleague in the office. The colleague would then access the relevant information on a visual interface and read out the same to the mobile professional.

With the advancement in technology, it became possible to replace the colleague in the office with an Interactive Voice Response (IVR) system. An IVR is a specialized computer system having a processor, storage device, hardware for interfacing the processor to the telephone network and an application program that runs on the said processor. When a user connects to the IVR system through a telephone, the system plays a pre-recorded voice greeting to the caller. Thereafter, the system plays a menu of options that can be selected by the caller, using the telephone dial pad keys. Once the caller selects the desired option, the response is read back by the IVR system to the caller, using machine-generated speech. However, this system requires the caller to navigate through various menu options to finally retrieve the relevant information; this is a time consuming process and requires the caller to be attentive throughout.

Some IVR systems include speech recognition software that enable the caller to select options by speaking a short word or phrase in addition to using the telephone dial pad keys. U.S. Pat. No. 6,154,527, which is titled 'Interactive voice response system', discloses such an IVR system. However, this speech recognition software can recognize only simple responses like "yes", "no" and a few more. The caller is thus unable to carry out complex transactions.

The next generation of speech recognition software enabled the development of IVR systems with language specific knowledge, intelligent pronunciation and unlimited vocabularies. This facilitated IVR systems in interpreting the caller's commands more precisely, thereby, leading to smoother and faster access to information.

There is an IVR system that enables a caller to access information from a telephone directory and that makes voice dialed outgoing calls. U.S. Pat. No. 6,163,596, which is titled 'Phonebook', discloses a system and method for generating and accessing a telephone directory using voice commands. This telephone directory comprises a database having a multiplicity of records that are accessible using voice commands. However, this system is limited to accessing information from this particular directory only, and it does not provide voice access to information from other data sources.

Various IVR systems enable access to information from data sources using voice commands. For instance, Siebel Systems Inc. of San Jose, Calif., USA, a company providing business application software for Customer Relations Management, provides an IVR system for enabling voice access to its data sources. This IVR system also enables the user to place a voice dialed outbound call to any of the contact numbers stored in the Siebel Database. It may be noted that this IVR system is able to access information only from the Siebel database. Similarly, JustTalk Inc. of Ann Arbor, Mich., USA, a company providing speech-interactive applications, provides an IVR system that is again specific to a particular database, namely PeopleSoft's CRM Sales database.

The abovementioned IVR systems are customized to access information using voice commands from only particular data sources. The caller cannot seamlessly access the information stored in disparate data sources and voice repositories in a single phone call session. Thus, these IVR systems are incapable of serving professionals who require access to enterprise information from multiple data sources such as Oracle, Remedy, I2, Microsoft Exchange and voice repositories such as Octel Voice Mail.

IVR systems that are being made available by companies like Xora Inc. of Mountain View, Calif., USA, enable voice access to multiple data sources. Xora Inc. has introduced Xora Platform, a system that combines automatic speech recognition technology and text to speech software to create an interface for enabling voice access to multiple data sources.

When a user connects to the Xora Platform, he/she is provided with a list of domains/data sources to choose from. Once the user selects the preferred domain, a list of queries/transactions that are specific to that particular domain are presented. The user keeps selecting the relevant query and giving appropriate input parameters (by using voice commands) till he/she is finally presented with the sought information. The user also has the option of redirecting the sought information to some other device. For example, the user can email or fax the information by giving appropriate voice commands to the IVR system.

In case the user wants to switch to another domain, he/she has to issue a voice command to that effect. Thereafter, the user is presented with a list of queries specific to this particular domain. Again, the user selects the relevant query and keeps giving appropriate input parameters till he/she finally receives the sought information.

Navigating through the data sources using the Xora Platform is a time consuming procedure. It requires the user to be prompt and alert to respond properly to the queries/transactions since it is not possible to issue voice commands to directly retrieve relevant information. Thus the user is unable to seamlessly navigate through multiple data sources easily and he/she has to issue commands to switch amongst the different data sources. Moreover, the system does not allow for placing of a voice dialed outbound call.

Although much work has been done in the area of IVR systems, the art does not adequately address the problem of providing seamless access to disparate data sources, without appreciably increasing the difficulty in the use of the system. Therefore, in light of the abovementioned drawbacks, there is a need for a system, method and computer program that enables seamless access to information from multiple data sources and voice repositories using voice commands, in a single phone call. A need also exists for a system and method that enables the user to make outbound calls on a phone network, whilst being connected to the system.

SUMMARY OF THE INVENTION

An object of the present invention is to provide a system and method for enabling voice activated seamless access to multiple data sources and voice repositories in a single phone call session.

A further object of the present invention is to provide a system and method for enabling a user to access information from multiple data sources directly without having to issue specific voice commands to switch amongst the different data sources and voice repositories.

Another object of the present invention is to enable the user to interact with the system using natural language voice commands.

Yet another object of the present invention is to enable the user make outbound calls to contacts while being connected to the system.

Yet another object of the present invention is to enable the user to redirect the relevant information to peripheral devices like fax machines and Personal Digital Assistants (PDAs).

Yet another object of the present invention is to enable the user to retrieve relevant information, make outbound calls, create tasks in the calendar and redirect information to peripheral devices by issuing voice commands, all in a single phone call session.

The present invention is a system and method that comprises a telephony platform for placement of calls, an automatic speech recognition engine and voice grammars for recognizing voice commands, a VoiceXML interpreter for parsing the voice commands, extractors for retrieving the relevant information from disparate data sources and voice repositories and a text to speech engine for converting the extracted information to an audio output.

The user calls on the telephony platform and issues voice commands for accessing information from these data sources and/or voice repositories. These voice commands are parsed and matched with the voice grammars by the Automatic Search Recognition engine and are encoded it into a VoiceXML stream. This VoiceXML stream is interpreted by the VoiceXML interpreter, which executes the necessary logic to guide the server to extract information using the relevant extractor. This extracted information is then converted into a VoiceXML stream by the VoiceXML Generator and passed to the VoiceXML interpreter. The VoiceXML Interpreter parses the VoiceXML stream and uses the text to speech engine to read out the information to the user.

BRIEF DESCRIPTION OF THE DRAWINGS

The preferred embodiments of the present invention will hereinafter be described in conjunction with the appended drawings provided to illustrate and not to limit the invention where like designations denote like elements, and in which.

DETAILED DESCRIPTION OF THE PREFERRED EMBODIMENTS

The present invention discloses a method and system for enabling voice-activated access to multiple data sources and voice repositories in a single phone call. Users can navigate across the multiple data sources and voice repositories seamlessly, in a single phone call session.

Figure 1:
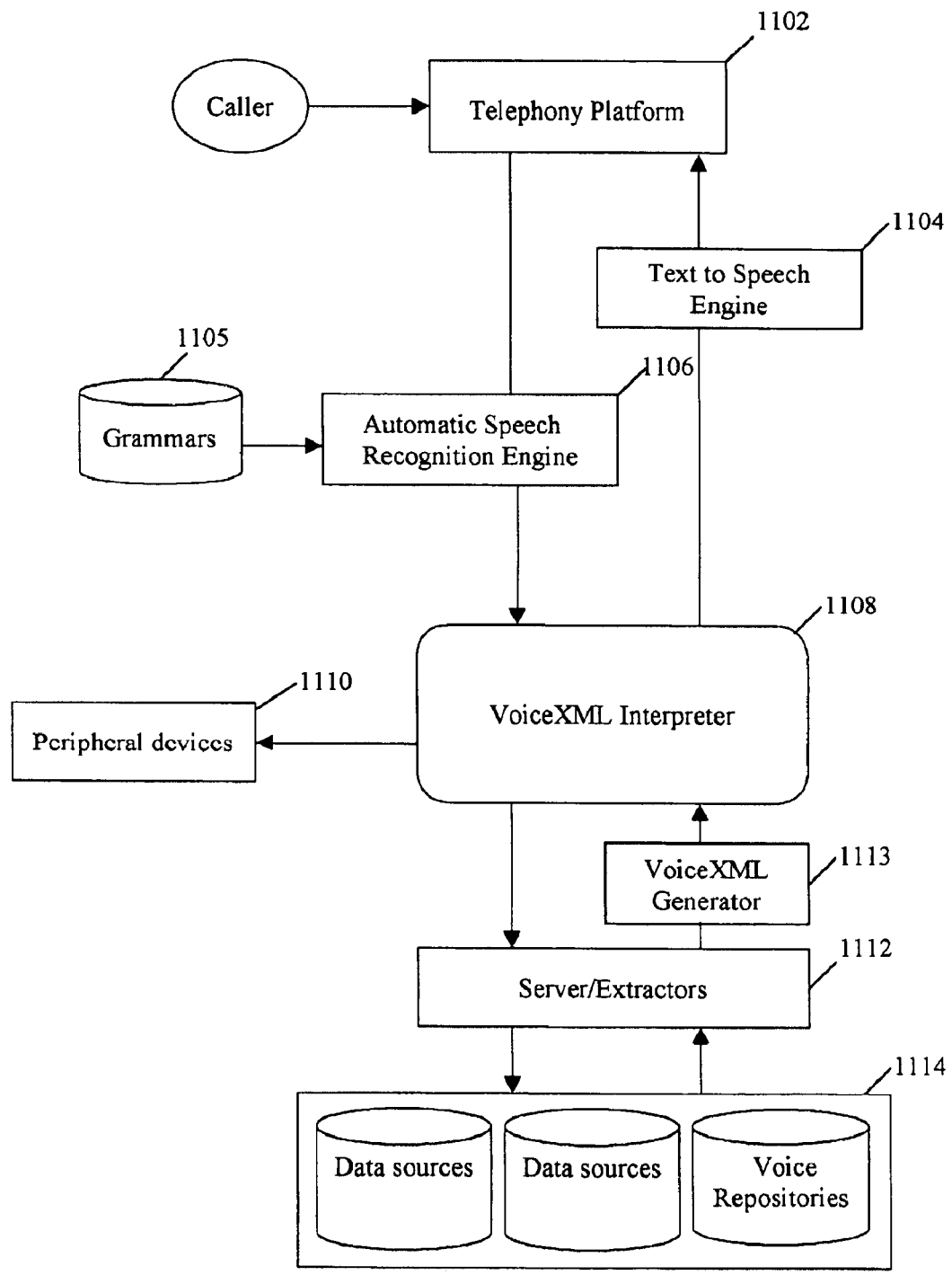
FIG. 1 is a block diagram illustrating the cooperation amongst elements of the system in accordance with a preferred embodiment of the present invention.

FIG. 1 is a block diagram illustrating the cooperation amongst elements of the system in accordance with a preferred embodiment of the present invention. Once the user places a call to the telephony platform's point of presence, the telephony platform 1102 holds this call on an incoming leg and creates an outbound leg to the server. The telephony platform 1102 supports various standard telephony features such as dialing, hanging up, putting on hold and conferencing. The user is then prompted for a user-id and a password for authentication. Once the user is authenticated, the system prompts the user to give voice commands. The user may give voice commands for retrieving information, making a call to a contact, creating/adding a task in the calendar or redirecting the retrieved information to an email address or a fax number.

The system has an automatic speech recognition (ASR) engine 1106, which includes voice grammars 1105 that span all possible contexts for different data sources and voice repositories. The primary function of the ASR engine 1106 is to process the user's speech and translate it into text that the system understands. When the user speaks something, these utterances are sent to the ASR engine 1106 to be processed. If the user does not speak anything, the ASR engine 1106 returns a silence timeout, which is an indication that there was no speech detected within the expected timeframe. The system then takes an appropriate action, such as re-prompting the user for voice commands.

An utterance can be a single word or it can contain multiple words (a phrase or a sentence). Further, these words can have multiple pronunciations associated with them. The ASR engine 1106 is configured to recognize multiple pronunciations for certain words and phrases to allow for variations in the way the callers may speak them. The ASR engine 1106 is also configured to recognize words that are acoustically similar. For example, the ASR engine 1106 can recognize words like "repeat" or "delete", "Addison" or "Maddison", distinctively.

The ASR engine 1106 uses grammars (1105) having a particular syntax or set of rules that define the words and phrases that can be recognized by the ASR engine 1106. The grammar defines the domain or context within which the ASR engine 1106 operates. The grammar can be configured to be flexible enough so that it approaches natural language capability.

For example, the top level grammars of the system may be created to accept commands such as calendar, phone calling, number lookup as well as auxiliary commands such as help, repeat etc as shown below:

```
{ $_VAD_V11 = $PG_PHONE_GRAMMAR |
             $CG_CALENDAR_GRAMMAR |
             $GP_GET_PHONE |
             $HL_HELP |
             $RP_REPEAT |
             $RD_REDIAL |
             $DL_DIALIT |
             $GB_GOODBYE |
             $DTMF_WORD;
}
```

The ASR engine 1106 parses the user's commands and matches them with the voice grammars. It attaches semantics to the voice commands matched and recognizes the context. For example, in the grammar segment given below, the ASR engine 1106 parses and attach semantics to a statement: "Get me my calendar for July 7, after 4 PM".

These natural language grammars 1105 allow the user to acquire information from the system without a menu-driven approach.

The voice grammars can be configured to support various natural languages such as English, Japanese and Chinese.

The ASR engine 1106 encodes the recognized and parsed voice commands into a VoiceXML stream. This VoiceXML stream is then parsed by a VoiceXML interpreter 1108. The VoiceXML interpreter 1108 executes the logic necessary to guide the server 1112 to the information desired by the user. The VoiceXML interpreter 1108 translates VoiceXML encoded voice commands into a format that can be understood by a server 1112. The server 1112 has extractors that extract information from multiple data sources and voice repositories 1114.

In a preferred embodiment of the present invention, the VoiceXML encoded voice commands translated by the VoiceXML interpreter 1108 are passed to the server 1112 using the Hyper Text Transfer Protocol (HTTP). The server 1112 activates an appropriate extractor(s) 1112 to extract the desired information.

These extractors 1112 are modules for data management. For example, one of the databases could be Microsoft Exchange, for which the extractor 1112 would use Messaging Application Program Interface (MAPI) and Collaboration Data Objects (CDO) to access data from the callers' mailbox. If the caller requests to contact someone by issuing a command such as; "Call Joe Smith on cell phone," the extractor 1112 queries Microsoft Exchange for the contact number of Joe Smith. This extracted information is converted into a VoiceXML stream by a VoiceXML generator 1113, and presented to VoiceXML interpreter 1108.

```
{
$CG_CALENDAR_GRAMMAR = [$CG_CALENDAR_PREFIX]
            $CG_CALENDAR_KEYWORD
            [
            [$TM_FOR][$TM_THE]
            $CG_DAY_TIME_GRAMMAR
            ];
KV_INSTR = getcalendar ;
KV_CAL_TIME = $CG_DAY_TIME_GRAMMAR ;
VALUE = $CG_CALENDAR_PREFIX $CG_CALENDAR_KEYWORD
$CG_DAY_TIME_GRAMMAR ;
}
# matches ==> "read" or "give" or "read me" or "give me"
{
$CG_CALENDAR_PREFIX = $SY_GET_ME_MY ;
VALUE = get ;
}
# matches ==> "calendar" or "schedule"
{
$CG_CALENDAR_KEYWORD = $TM_CALENDAR | $TM_SCHEDULE |
$TM_APPOINTMENT |
            $TM_APPOINTMENTS ;
VALUE = calendar ;
}
{
$CG_DAY_TIME_GRAMMAR = $CG_LOCAL_DAY_TIME_GRAMMAR;
VALUE = $CG_LOCAL_DAY_TIME_GRAMMAR;
}
{
$CG_LOCAL_DAY_TIME_GRAMMAR = $CG_RELATIVE_GRAMMAR |
            $CG_ABSOLUTE_MONTH_DAY_GRAMMAR |
            $CG_ABSOLUTE_DAY_OF_WEEK_GRAMMAR;
}
```

For example, the following may be the generated VoiceXML stream that is presented to the VoiceXML interpreter in case of a request like placing a call to "Joe Smith" on cell phone number "650-555-8135":

```
<?xml version="1.0" ?>
<XMLPage TYPE="IVR" PAGEID="TAKEACTION" SESSIONID="$sessionid$"
    HREF="$ivr-root-
    dir$/cleanup.asp?EX=END&CID=4082612495&UID=6313827&PWD=6313827&TM=$
    ivr-root-dir$&SI=$sessionid$&PP=TAKEACTION">
<TONEMAP>
    <TONE TONEID="*" HREF="$ivr-root-
        dir$/interrupt.asp?NA=MENUWHATTODO&CID=4082612495&UID=6313827&PWD=
        6313827&TM=$ivr-root-dir$&SI=$sessionid$&PP=TAKEACTION"/>
    </TONEMAP>
<PLAY>
    <TEXT VALUE="calling joe smith, on cell phone, ,"/>
    <PAUSE TIME="4"/>
    </PLAY>
<EXCEPTIONMAP>
    <EXCEPTION EVENT="CREATE_LEG_ERROR" HREF="$ivr-root-
        dir$/cleanup.asp?LER=$last-error$&LES=$last-error-
        string$&CID=4085552495&UID=633313827&PWD=633313827&TM=$ivr-root-
        dir$&SI=$sessionid$&PP=TAKEACTION&EX=CLEGERR"/>
    <EXCEPTION EVENT="DIAL_ERROR" HREF="$ivr-root-dir$/cleanup.asp?LER$last-
        error$&LES=$last-error-
        string$&CID=4085552495&UID=633313827&PWD=633313827&TM=$ivr-root-
        dir$&SI=$sessionid$&PP=TAKEACTION&EX=DIALERR&CPA=$cparesult$"/>
    <EXCEPTION EVENT="OTHER" HREF="$ivr-root-dir$/cleanup.asp?LER=$last-
        error$&LES=$last-error-
        string$&CID=4085552495&UID=633313827&PWD=633313827&TM=$ivr-root-
        dir$&SI=$sessionid$&PP=TAKEACTION&EX=OTHER"/>
    </EXCEPTIONMAP>
<TONEMAP>
    <TONE TONEID="*" HREF="$ivr-root-
        dir$/intalertleg.asp?NA=ALERTLEG&CID=4085552495&UID=633313827&PWD=633
        313827&TM=$ivr-root-dir$&SI=$sessionid$&PP=TAKEACTION"/>
    </TONEMAP>
    <CREATE_LEG_AND_DIAL TELNUM="6505558135" ANI="4085552495"
        BRIDGE="YES" URL_ONLEG2HUP="$ivr-root-
        dir$/interrupt_cld.asp?PHN=6505558135&NA=WITHLOGMENUWHATTODO&CID=4
        085552495&UID=633313827&PWD=633313827&TM=$ivr-root-
        dir$&SI=$sessionid$&PP=TAKEACTION" ENDSESSIONONHUP="NO"
        IVRURL="LEG_WAIT" CPATIMEOUT="12"/>
    <LEG_WAIT/>
    </XMLPage>
```

The VoiceXML interpreter 1108 parses the VoiceXML stream and uses the Text to Speech engine 1104 to read out the information to the user.

The VoiceXML interpreter 1108 controls the telephony platform 1102 for making outbound voice calls to a phone number that may have been extracted from any of the data sources. The user may also direct the system to make a call to a number specified by the user.

The VoiceXML interpreter 1108 is also able to redirect the extracted information to peripheral devices 1110 such as fax machine and PDA as desired by the user. For example, the information may be faxed or emailed to a number or address extracted from any of the data sources and voice repositories.

The VoiceXML interpreter 1108 also enables the user to add tasks and appointments to their calendar in the data sources.

The system thus enables the user to retrieve relevant information from various data sources and/or voice repositories, make outbound calls, redirect information to peripheral devices 1110 and make additions to the calendar by issuing voice commands consecutively, in a single phone call session.

Figure 2A:
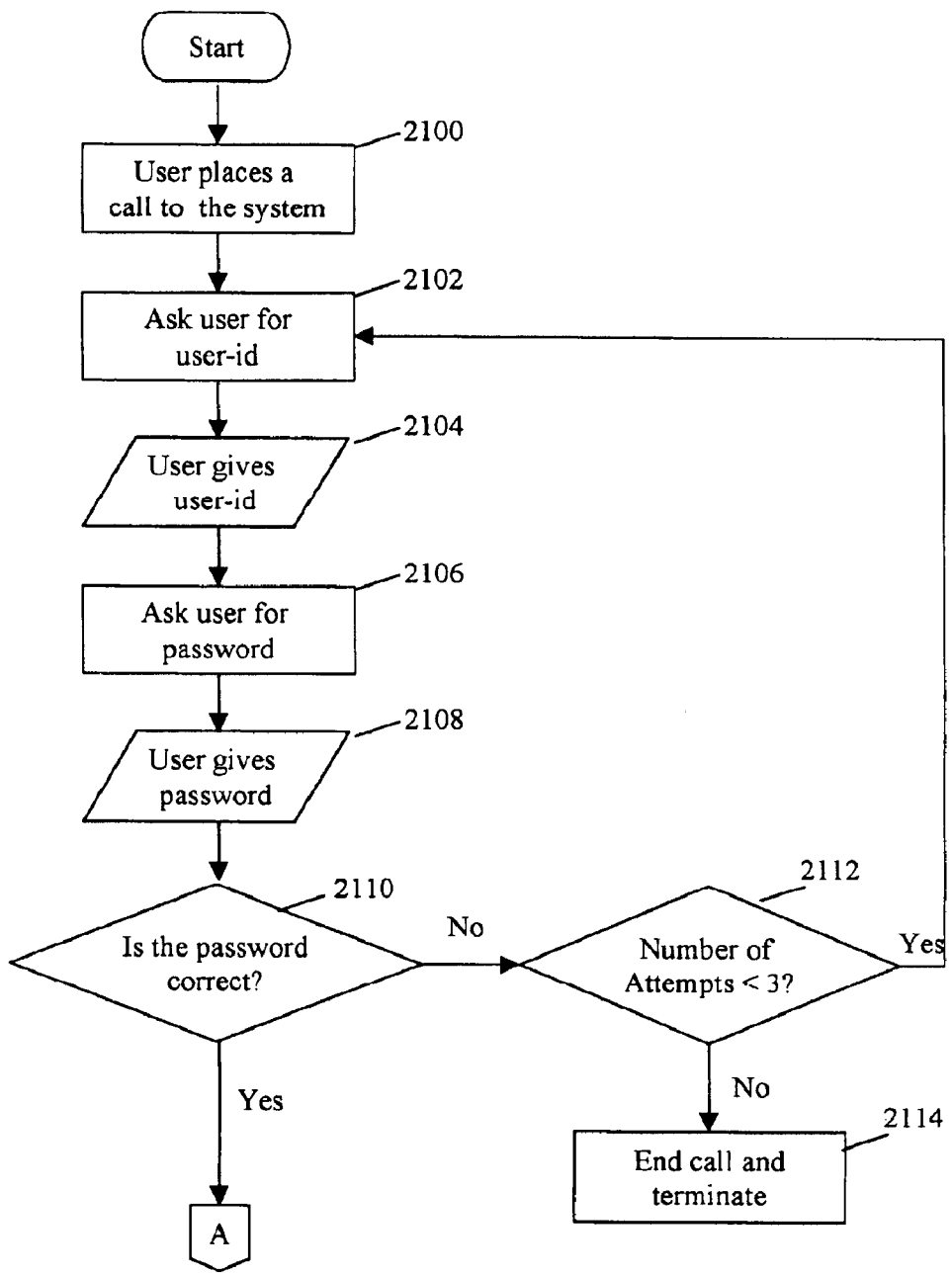
FIG. 2A is a flowchart illustrating the steps involved in the authentication of a user in accordance with a preferred embodiment of the present invention.

FIG. 2A is a flowchart illustrating the steps involved in the authentication of a user in accordance with the preferred embodiment of the present invention.

All authorized users of the system are provided with a user-id and numeric password for authentication. Upon placing a call to system 2100, the user is prompted for a user-id 2102 and numeric password 2106. Users can enter their numeric passwords 2108 and user-ids 2104 using voice or the telephone's touch-tone keypad.

If the user supplied password matches with stored one 2110, then he/she is granted access to the system. In case the password provided does not match, the system once again asks for the user-id and password. The whole authentication process repeats until the correct password is provided. At the end of three attempts 2112, if the password provided by the user does not match with the stored one, the call is terminated at 2114.

In an alternative embodiment of the present invention, the numbers from which the user is likely to place a call and the corresponding user ID are stored in a list. In such a case, the system uses the incoming caller-id from the phone system and matches it against one of the stored numbers in the list to try and predict the user-id. If there is a match, the user-id is thus automatically determined and the user is only asked for the password.

Figure 2B:
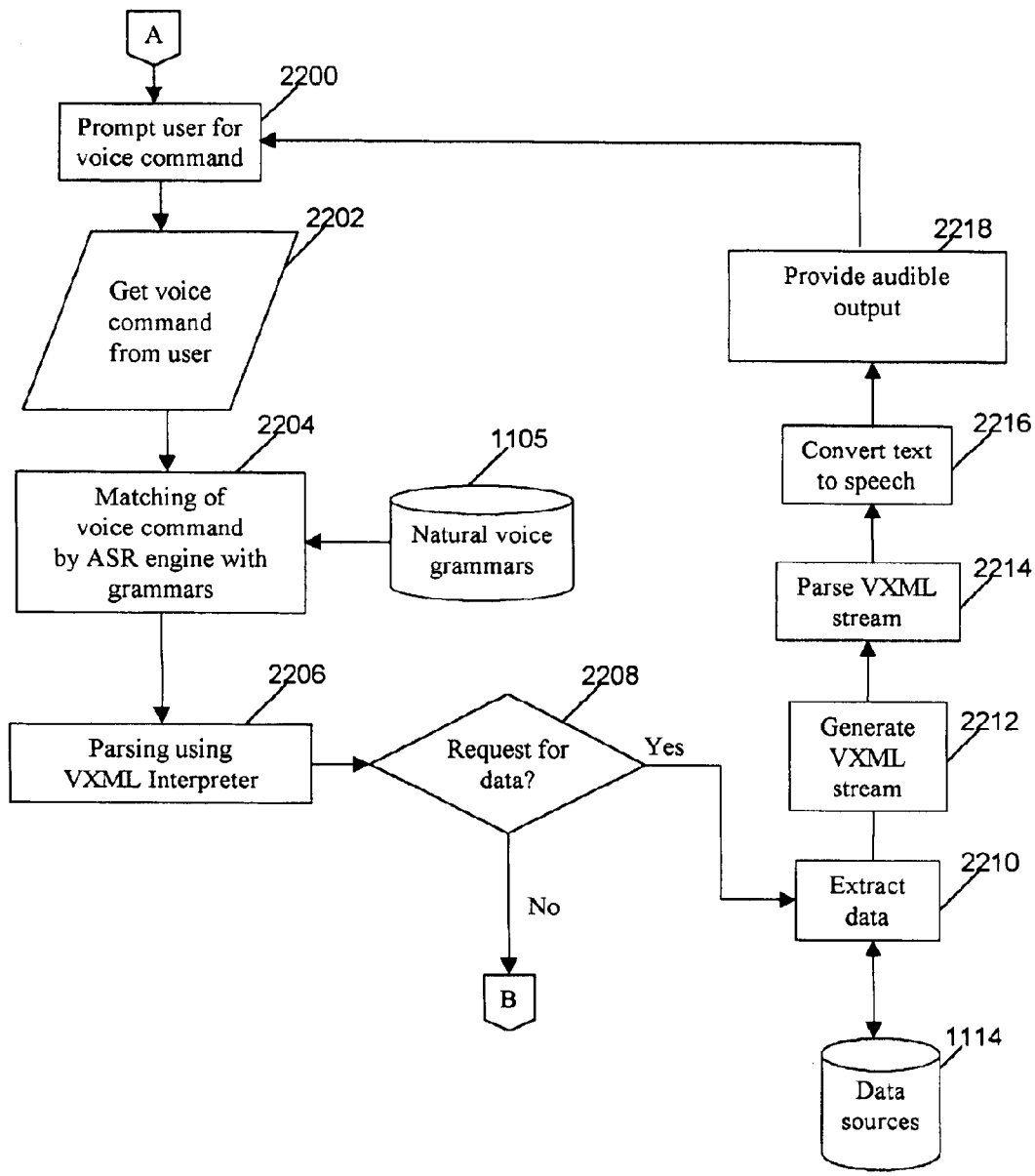
FIG. 2B is a flowchart illustrating the operation of the system when a user places a "data request" in accordance with a preferred embodiment of the present invention.

FIG. 2B is a flowchart illustrating the operation of the system when a user places a "data request" in accordance with the preferred embodiment of the present invention. A "data request" is a request that involves fetching of data from the multiple data sources and voice repositories. For example, a request for fetching the sales report for the second quarter or getting the user's calendar of appointments for a given day/date would constitute a "data request".

Once the user has been authenticated, the system prompts the user for a voice command 2200. The user gives a command 2202 to obtain the relevant information. The ASR engine 1106 matches the user's commands at 2204 with the natural voice grammars 1105 and attaches semantics to the same. The ASR 1106 engine then converts the voice commands into a VoiceXML stream. This VoiceXML stream is parsed at 2206 by the VoiceXML interpreter 1108, which decides whether it is a "data request" or an "action request". In case of a "data request" 2208, ASR engine sends this request to the server 1112. The server 1112 activates the relevant extractor, which extracts at 2210 the desired information from a relevant data source and/or voice repository 1114. This information is converted into a VoiceXML stream 2212 by the VoiceXML generator 1113. The VoiceXML stream is parsed at 2214 by the VoiceXML interpreter 1108 and converted to speech at 2216 using the Text to Speech engine 1104. The Text to Speech engine 1104 enables an audible output 2218 of the information.

The caller can also "barge in" or interrupt if he does not want the system to continue reading out the desired information. The caller can issue a command to that effect such as "Pause". Also, once the user has issued a voice command to the system and does not want the same to be executed, he can give a command to that effect, such as "Cancel". Thereafter, the system will again prompt the user for the voice command 2200.

Figure 2C:
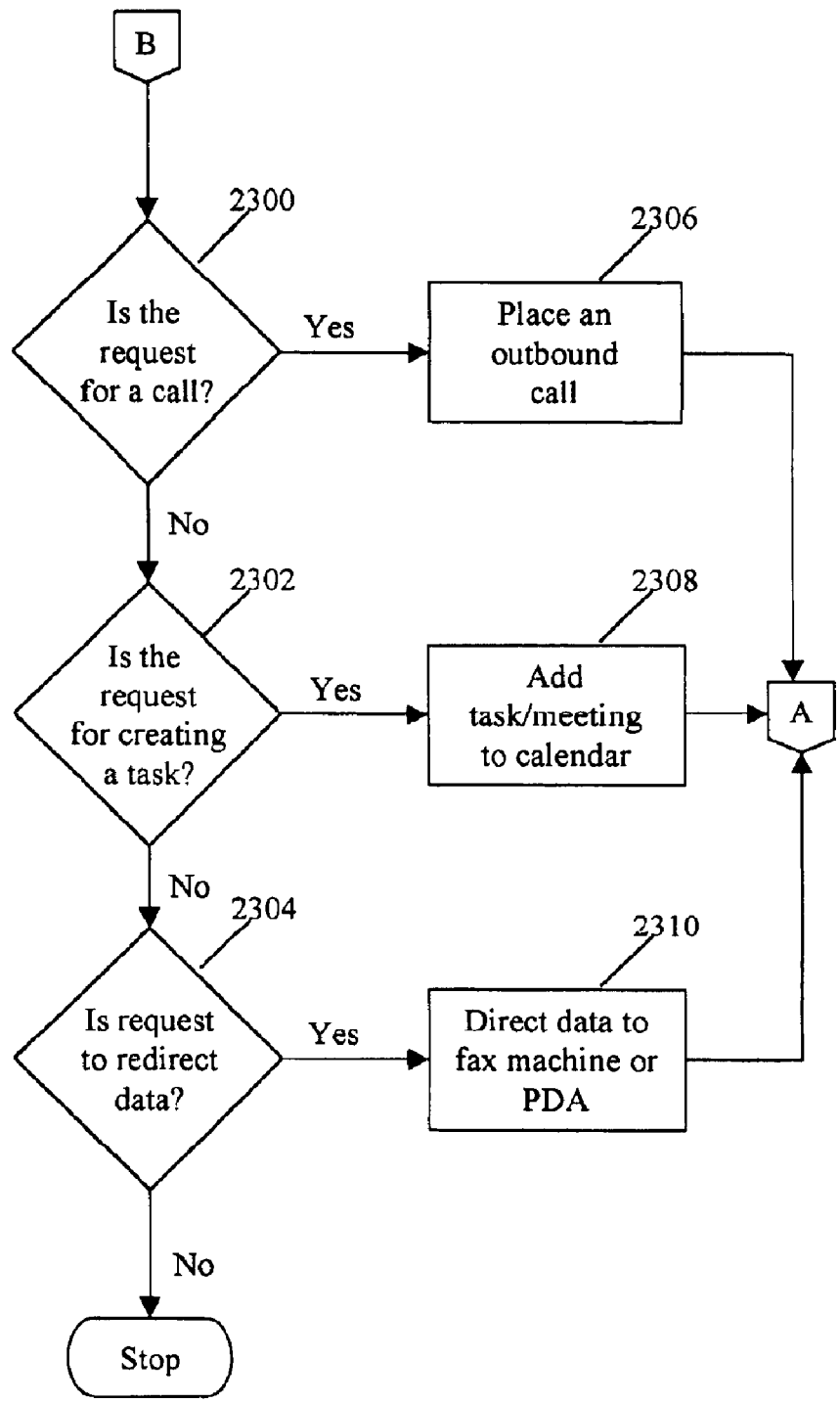
FIG. 2C is a flowchart illustrating the operation of the system when a user places an "action request" in accordance with a preferred embodiment of the present invention.

FIG. 2C is a flowchart illustrating the operation of the system when a user places an "action request" in accordance with the preferred embodiment of the present invention. An "action request" is a request that involves placing of a call to a contact, creating or adding a task or appointment in the calendar or redirecting information to peripheral devices.

In case the user issues a voice command for placing a call 2300 to a contact, whose number is stored in a data source, the system sends a request to the server, which activates the relevant extractor to extract the contact number from the relevant data source or voice repository. The extracted information is converted into a VoiceXML stream by the VoiceXML generator 1113 and parsed by the VoiceXML interpreter 1108. Thereafter, the VoiceXML interpreter places an outbound call 2306 to that number using the telephony platform 1102, and connects the user to the contact. After the conversation is over, the user can press a key like "*", or give the voice command "hang up" to indicate to the system that he may now be disconnected from that contact. Thereafter, the system again prompts the user for a voice command 2200.

In case a user issues a command for redirecting information 2304 to a peripheral device, the system sends a request to the server, which activates the relevant extractor to extract the desired information from the relevant data source or voice repository. The extracted information is converted into a VoiceXML stream by the VoiceXML generator 1113 and parsed by the VoiceXML interpreter 1108. Thereafter, the VoiceXML interpreter 1108 redirects the output and sends it to a peripheral device 2310. This peripheral device maybe a fax machine or a Personal Digital Assistant. Thereafter, the user is again prompted for a voice command.

In an alternative embodiment of the present invention, the user can issue voice commands for adding 2302 a task or an appointment to a calendar and the same can be added at 2308 to the calendar in the relevant data source.

The following example illustrates the operation of the system. The user issues voice commands one after another, and the system responds with the appropriate data/action. All this happens in a single phone call session.

1. User calls into a telephone number that has been provisioned to connect to the server.
2. System: Please give me your password.
3. User: [Enters his password using voice or the touch tone key pad]
4. System: Please give me your user identification number.
5. User: [Enters his user identification number using voice or the touch tone key pad]
6. System: Please wait while I authenticate you.
7. [Assuming that the user has authenticated properly, the rest of the interaction goes as follows:]
8. System: What can I do for you?
9. User: Give me my calendar for Thursday
10. [System will access the user's calendar from Microsoft Exchange, a data source]
11. System: Here is your calendar for Thursday. [System reads out the user's calendar for Thursday].
12. System: What can I do for you?
13. User: Call John Smith on work phone.
14. [System will access the John Smith's phone number from the user's contact list in Microsoft Exchange, another data source. It will then proceed to dial John Smith on this number]
15. System: Calling John Smith on work phone number 408 555 1234
16. [User and John Smith carry on a phone conversation. After they are done, the user hits the "*" key on his touch tone pad to hang up the outbound call]
17. System: What can I do for you?
18. User: Get me the sales report for Q 3.
19. [System will access the sales report for the third quarter from the user's Siebel Sales Force Automation system, yet another data source]
20. System: Here is the sales report you requested . . . [System reads out the requested sales report].
21. System: What can I do for you?
22. User: Connect to my voice mail.
23. [System dials the user's pre-configured voice mail number and authenticates him.]
24. System: There are 4 voice mails.
25. User: Play
26. System: [Playing out the voice mail] Hi, this is John Doe. Please call me back on my cell phone regarding the order I placed for Widget X.
27. User: Pause
28. [The voice mail system is put on pause and the system picks up with the familiar prompt . . . ]
29. System: What can I do for you?
30. User: Call John Doe on cell phone.
31. [System will access the John Doe's phone number from the user's contact list in Microsoft Exchange. It will then proceed to dial John Doe on that number]
32. [User and John Doe carry on a phone conversation about John Doe's order for Widget X! After they are done, the user hits the "*" key on his touch tone pad to hang up the call]
33. System: What can I do for you?
34. User: Resume voice mail
35. System: Voice mail resumed.
36. [At this point the user has connected back to the voice mail system]
37. User: Next
38. System: [Playing out the next voice mail] Hi, this is John Doe again. Please double my order for Widget X. Please call me back on my cell phone if you have any questions.

39. System: What can I do for you?
40. User: Give me my appointments for Wednesday after 3 pm? [System will access the user's appointments from a data source]
41. System: Here are your appointments for Wednesday after 3 pm. [System reads out the user's appointments for Wednesday after 3 pm].
42. System: What can I do for you?
43. User: Goodbye
44. System: Goodbye.

Thus, the system enables the user to place a call to the system and access information from the Microsoft Exchange calendar, followed by a voice dialed call to a contact in Siebel database, followed by an interaction with the voice mail system followed by another data lookup from Microsoft Exchange (not necessarily in the said order) as desired by the user, all in a single phone call session.

While the preferred embodiments of the invention have been illustrated and described, it will be clear that the invention is not limited to these embodiments only. Numerous modifications, changes, variations, substitutions and equivalents will be apparent to those skilled in the art without departing from the spirit and scope of the invention as described in the claims.

What is claimed is:

1. A method for providing voice activated seamless access to a plurality of disparate data sources and voice repositories in a single phone call session, the method comprising the steps of:
   logging on by a user;
   recognizing voice commands issued by the user comprising:
   automatically identifying the context of the recognized commands, by analyzing the recognized voice commands;
   automatically identifying the data sources and voice repositories required to be accessed, using the identified context; and
   automatically identifying the information desired by the user, by analyzing the recognized voice commands, the information pertaining to the identified contexts, without the user being prompted for inputs;
   interpreting the voice commands;
   extracting the identified information from the identified data sources and voice repositories;
   presenting the extracted information to the user;
   wherein said logging step further comprises the steps of;
   placing a call to a telephony platform by the user;
   holding the call on an incoming leg by the telephony platform;
   creating an outbound leg by the telephony platform to a server;
   directing extractors for a VoiceXML stream for authenticating the user; and
   authenticating the user.

2. The method for providing voice activated access to information as recited in claim 1, wherein said directing step is done using Hyper Text Transfer Protocol (HTTP).

3. A method for providing voice activated seamless access to a plurality of disparate data sources and voice repositories in a single phone call session, the method comprising the steps of:
   logging on by a user;
   recognizing voice commands issued by the user comprising:
   automatically identifying the context of the recognized commands, by analyzing the recognized voice commands;
   automatically identifying the data sources and voice repositories required to be accessed, using the identified context; and
   automatically identifying the information desired by the user, by analyzing the recognized voice commands, the information pertaining to the identified contexts, without the user being prompted for inputs;
   interpreting the voice commands;
   extracting the identified information from the identified data sources and voice repositories;
   presenting the extracted information to the user;
   wherein said presenting step further comprises the steps of:
   parsing the VoiceXML stream by an interpreter; and
   performing an actionable step;
   wherein said performing step comprises instructing the telephony platform to place an outbound call, putting the call on hold, and later reconnecting to the call on hold.

4. A computer program product for providing voice activated seamless access to information from a plurality of disparate data sources and voice repositories in a single phone call session, the computer program product embodied on one or more computer readable media and comprising:
   a computer readable program code means for logging by a user;
   a computer readable program code means for recognizing voice commands issued by the user, the computer program code means comprising:
   computer readable program code means for automatically identifying context of the recognized commands by analyzing the recognized voice commands;
   computer readable program code means for automatically identifying the data sources and voice repositories required to be accessed, using the identified context; and
   computer readable program code means for automatically identifying information desired by the user by analyzing recognized voice commands, the identification being done using the identified contexts without the user being prompted for inputs;
   a computer readable program code means for interpreting the voice commands;
   a plurality of computer readable program code means for extracting the identified information from the identified data sources and voice repositories;
   a computer readable program code means for presenting the extracted information to the user;
   wherein said computer readable program code means for logging comprises:
   a computer readable program code means for placing a call to by the user;
   a computer readable program code means for holding the call on an incoming leg;
   a computer readable program code means for creating an outbound leg;
   a computer readable program code means for directing extractors for a VoiceXML stream; and
   a computer readable program code means for authenticating the user.

5. A computer program product for providing voice activated seamless access to information from a plurality of disparate data sources and voice repositories in a single phone call session, the computer program product embodied on one or more computer readable media and comprising:
   a computer readable program code means for logging by a user;
   a computer readable program code means for recognizing voice commands issued by the user, the computer program code means comprising:
   computer readable program code means for automatically identifying context of the recognized commands by analyzing the recognized voice commands;
   computer readable program code means for automatically identifying the data sources and voice repositories required to be accessed, using the identified context; and
   computer readable program code means for automatically identifying information desired by the user by analyzing recognized voice commands, the identification being done using the identified contexts without the user being prompted for inputs;
   a computer readable program code means for interpreting the voice commands,
   a plurality of computer readable program code means for extracting the identified information from the identified data sources and voice repositories;
   a computer readable program code means for presenting the extracted information to the user;
   wherein said computer readable program code means for presenting the extracted information to the user comprises:
   computer readable program code means for parsing the VoiceXML stream by the interpreter; and
   computer readable program code means for performing an actionable step;
   wherein said computer readable program code means for performing an actionable step comprises computer readable program code means for placing an outbound call for the user.

6. An apparatus for providing voice activated seamless access to a plurality of disparate data sources and voice repositories in a single phone call session, the apparatus comprising:
   means for logging on by a user;
   means for recognizing voice commands issued by the user comprising:
   means for automatically identifying the context of the recognized commands, by analyzing the recognized voice commands;
   means for automatically identifying the data sources and voice repositories required to be accessed, using the identified context; and
   means for automatically identifying the information desired by the user, by analyzing the recognized voice commands, the information pertaining to the identified contexts, without the user being prompted for inputs;
   means for interpreting the voice commands;
   means for extracting the identified information from the identified data sources and voice repositories;
   means for presenting the extracted information to the user;
   wherein said means for logging further comprises:
   means for placing a call to a telephony platform by the user;
   means for holding the call on an incoming leg by the telephony platform;
   means for creating an outbound leg by the telephony platform to a server;
   means for directing extractors for a VoiceXML stream for authenticating the user; and
   means for authenticating the user.

7. An apparatus for providing voice activated seamless access to a plurality of disparate data sources and voice repositories in a single phone call session, the apparatus comprising:
   a processor;
   a machine-readable medium including instructions executable by the processor, including:
   one or more instructions for logging on by a user;
   one or more instructions for recognizing voice commands issued by the user comprising:
   one or more instructions for automatically identifying the context of the recognized commands, by analyzing the recognized voice commands;
   one or more instructions for automatically identifying the data sources and voice repositories required to be accessed, using the identified context; and
   one or more instructions for automatically identifying the information desired by the user, by analyzing the recognized voice commands, the information pertaining to the identified contexts, without the user being prompted for inputs;
   one or more instructions for interpreting the voice commands;
   one or more instructions for extracting the identified information from the identified data sources and voice repositories;
   one or more instructions for presenting the extracted information to the user;
   one or more instructions for placing a call to a telephony platform by the user;
   one or more instructions for holding the call on an incoming leg by the telephony platform;
   one or more instructions for creating an outbound leg by the telephony platform to a server;
   one or more instructions for directing extractors for a VoiceXML stream for authenticating the user; and
   one or more instructions for authenticating the user.

8. A computer data signal embodied in a carrier wave comprising instructions for providing voice activated seamless access to a plurality of disparate data sources and voice repositories in a single phone call session, including:
   one or more instructions for logging on by a user;
   one or more instructions for recognizing voice commands issued by the user comprising:
   one or more instructions for automatically identifying the context of the recognized commands, by analyzing the recognized voice commands;
   one or more instructions for automatically identifying the data sources and voice repositories required to be accessed, using the identified context; and
   one or more instructions for automatically identifying the information desired by the user, by analyzing the recognized voice commands, the information pertaining to the identified contexts, without the user being prompted for inputs;

one or more instructions for interpreting the voice commands;

one or more instructions for extracting the identified information from the identified data sources and voice repositories;

one or more instructions for presenting the extracted information to the user;

one or more instructions for placing a call to a telephony platform by the user;

one or more instructions for holding the call on an incoming leg by the telephony platform;

one or more instructions for creating an outbound leg by the telephony platform to a server;

one or more instructions for directing extractors for a VoiceXML stream for authenticating the user; and one or more instructions for authenticating the user.

* * * * *